(12) United States Patent
Wang et al.

(10) Patent No.: US 10,904,840 B2
(45) Date of Patent: Jan. 26, 2021

(54) METHOD AND DEVICE FOR SETTING TRANSMISSION POWER OF COMMUNICATION SYSTEM

(71) Applicant: SZ DJI TECHNOLOGY CO., LTD., Shenzhen (CN)

(72) Inventors: Yan Wang, Shenzhen (CN); Naibo Wang, Shenzhen (CN); Wei Fan, Shenzhen (CN); Han Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/722,868

(22) Filed: Dec. 20, 2019

(65) Prior Publication Data

US 2020/0137693 A1 Apr. 30, 2020

Related U.S. Application Data

(63) Continuation of application No. PCT/CN2017/089094, filed on Jun. 20, 2017.

(51) Int. Cl.
| | | |
|---|---|---|
| *H04W 52/24* | (2009.01) | |
| *H04W 16/14* | (2009.01) | |
| *H04W 52/14* | (2009.01) | |
| *H04W 52/22* | (2009.01) | |
| *H04W 52/36* | (2009.01) | |

(Continued)

(52) U.S. Cl.
CPC ......... *H04W 52/243* (2013.01); *H04W 16/14* (2013.01); *H04W 52/146* (2013.01); *H04W 52/22* (2013.01); *H04W 52/367* (2013.01); *H04W 72/0473* (2013.01); *H04W 72/085* (2013.01)

(58) Field of Classification Search
CPC ...... H04B 17/318; H04B 17/309; H04B 3/52; H04B 3/56; H04B 3/58; H04B 10/116; H04B 10/807; H04B 3/54; H04B 3/542; H04B 7/0452; H04B 10/1143; H04B 10/25; H04B 10/40; H04B 10/516; H04B 10/6911
USPC ...................................... 455/127.1
See application file for complete search history.

(56) References Cited

U.S. PATENT DOCUMENTS

| | | | |
|---|---|---|---|
| 2008/0112360 A1 | 5/2008 | Seidel et al. | |
| 2018/0098292 A1* | 4/2018 | Gulati | H04W 52/283 |

FOREIGN PATENT DOCUMENTS

| | | |
|---|---|---|
| CN | 101068434 A | 11/2007 |
| CN | 101741479 A | 6/2010 |
| CN | 102421104 A | 4/2012 |

(Continued)

OTHER PUBLICATIONS

The World Intellectual Property Organization (WIPO) International Search Report for PCT/CN2017/089094 dated Mar. 6, 2018 5 pages.

*Primary Examiner* — Tu X Nguyen
(74) *Attorney, Agent, or Firm* — Anova Law Group, PLLC

(57) ABSTRACT

A transmission power setting method includes selecting one of a plurality of channels of a communication system as a target channel for communication, and, based on pre-set communication parameters, setting a transmission power of the communication system to be a maximum transmission power corresponding to the target channel. The pre-set communication parameters include maximum transmission powers for the plurality of channels.

12 Claims, 5 Drawing Sheets

(51) Int. Cl.
*H04W 72/04* (2009.01)
*H04W 72/08* (2009.01)

(56) References Cited

FOREIGN PATENT DOCUMENTS

| | | | |
|---|---|---|---|
| CN | 102761947 | A | 10/2012 |
| CN | 103237355 | A | 8/2013 |
| CN | 103957565 | A | 7/2014 |
| CN | 104581914 | A2 | 4/2015 |
| WO | 2008052385 | A1 | 5/2008 |

\* cited by examiner

METHOD AND DEVICE FOR SETTING TRANSMISSION POWER OF COMMUNICATION SYSTEM

CROSS-REFERENCES TO RELATED APPLICATION

This application is a continuation of International Application No. PCT/CN2017/089094, filed on Jun. 20, 2017, the entire content of which is incorporated herein by reference.

TECHNICAL FIELD

The present disclosure relates to the field of wireless communication and, more particularly, to a method and a device for setting a transmission power of a communication system.

BACKGROUND

Due to nonlinearity of a power amplifier in a transmitter, when a high-power signal is transmitted, the amplified high-power signal may substantially leak outside an effective spectral band of the high-power signal. Leaking into unauthorized spectral band and specially restricted spectral band is strictly regulated in various countries. It is more difficult to meet the spectral leakage specification than the transmission power upper limit specification. As a result, the transmitter may only transmit signals at a transmission power level lower than the transmission power upper limit in the unauthorized spectral band, thereby limiting an effective communication distance. This problem has existed for a long time since relevant standards were established.

In the existing technology, there are primarily three methods for solving the spectral leakage problem.

1. Reducing the transmission power to ensure compliance with a spectral leakage specification. The method substantially reduces the effective communication distance. For example, if all other conditions are the same but the transmission power is reduced by 3 dB, the effective communication distance is reduced by 30%.

2. Avoiding using edge frequencies in the periphery of the spectral band to ensure compliance with the spectral leakage specification. This method forces multiple devices operating in the same spectral band to occupy a center portion of the spectral band resource, thereby causing mutual interferences, degrading communication quality, and leaving the periphery of the spectral band unused by any devices.

3. Using more sophisticated technologies to ensure compliance with a spectral leakage specification, which includes, for example, using a power amplifier having a higher saturation power, using a digital filter technique, using a crest factor reduction (CFR) technique, and using a digital predistortion technique. However, these techniques substantially increase system cost.

SUMMARY

In accordance with the disclosure, there is provided a transmission power setting method including selecting one of a plurality of channels of a communication system as a target channel for communication, and, based on pre-set communication parameters, setting a transmission power of the communication system to be a maximum transmission power corresponding to the target channel. The pre-set communication parameters include maximum transmission powers for the plurality of channels.

Also in accordance with the disclosure, there is provided a transmission power setting device including a memory storing a transmission power setting command, and a processor configured to invoke the transmission power setting command to select one of a plurality of channels of a communication system as a target channel for communication, and, based on pre-set communication parameters, set a transmission power of the communication system to be a maximum transmission power corresponding to the target channel. The pre-set communication parameters include maximum transmission powers for the plurality of channels.

Also in accordance with the disclosure, there is provided a computer readable storage medium storing a computer program that, when executed by a processor, causes the processor to select one of a plurality of channels of a communication system as a target channel for communication, and, based on pre-set communication parameters, set a transmission power of the communication system to be a maximum transmission power corresponding to the target channel. The pre-set communication parameters include maximum transmission powers for the plurality of channels.

By using the method, device, and storage medium consistent with the disclosure, system cost is not substantially increased, frequency band resource is fully utilized, and the transmission power is maximized without violating a transmission power specification and a spectral leakage specification permitted by regulations.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
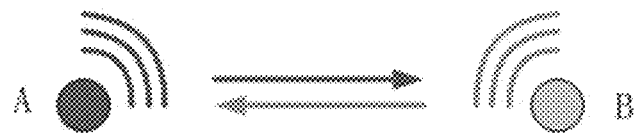
FIG. 1 is a schematic view of a network system according to an example embodiment of the present disclosure.

FIG. 1 is a schematic view of a network system according to an example embodiment of the present disclosure. The system may be used for point-to-point communication between a device A and a device B. In addition, the system may also be used for point-to-multi-point communication. That is, there are a plurality of devices A or devices B. Specifically, the system may be used for image transmission communication and remote-control communication services of an unmanned aerial vehicle (UAV) system. For example, the device A is a UAV, and the device B is a ground-based remote controller. The device A may send collected image information to the device B. In this case, the device A is a transmitter, and the device B is a receiver. On the other hand, the device B may also send various remote-control commands to the device A for controlling flying of the device A. In this case, the device A is the receiver, and the device B is the transmitter.

Figure 2:
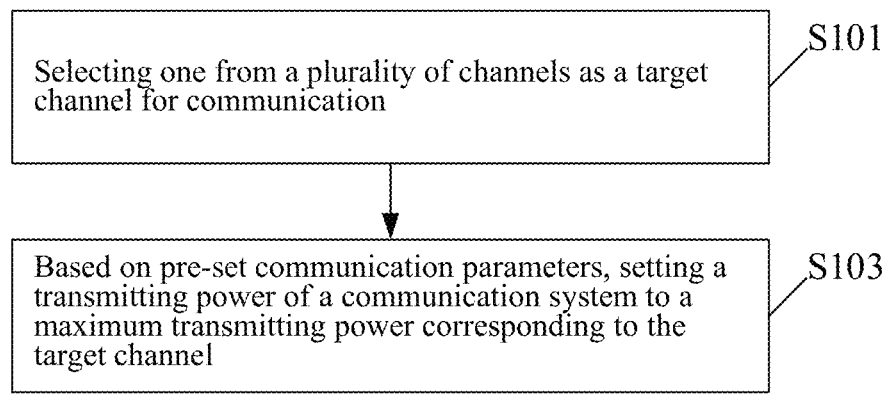
FIG. 2 is a flowchart of a method for setting a transmission power of a communication system according to an example embodiment of the present disclosure.

Referring to FIG. 2, in some embodiments, a method for setting a transmission power of a communication system may include at least the following.

At S101, one channel is selected from a plurality of channels as a target channel for communication.

Specifically, a set of available channels in an operating frequency band of the communication system is defined. The set of channels includes all frequencies of available frequency band.

Specifically, the plurality of channels can be all of the channels in the set of available channels in the operating frequency band of the communication system.

Specifically, the target channel may be a channel having the optimized quality parameter among all available channels.

In some embodiments, the quality parameter may be a signal-to-interference-plus-noise ratio (SINR), i.e., a ratio of a transmission power over a sum of an interference signal power and a noise power. The lower the SINR is, the better the quality parameter is. Thus, the target channel may be the channel having the lowest SINR among all available channels.

In some embodiments, the quality parameter may be a signal-to-noise ratio (SNR), i.e., a ratio of the transmission power over the noise power. The lower the SNR is, the better the quality parameter is. Thus, the target channel may be the channel having the lowest SNR among all available channels.

In some embodiments, the quality parameter may be a signal-to-interference ratio (SIR), i.e., a ratio of the transmission power over the interference signal power. The lower the SIR is, the better the quality parameter is. Thus, the target channel may be the channel having the lowest SIR among all available channels.

At S103, based on pre-set communication parameters, the transmission power of the communication system is set to a maximum transmission power corresponding to the target channel.

Specifically, the pre-set communication parameters include the maximum transmission power for each of the plurality of channels. The maximum transmission power for each of the plurality of channels is obtained based on the compliance with the spectral leakage specification and the transmission power specification.

Specifically, the maximum transmission power corresponding to complying with the pre-set spectral leakage condition and the transmission power condition respectively can be measured offline by those skilled in the art. The measured maximum transmission power corresponding to each channel is saved in a table format in memories of the transmitter and the receiver, respectively.

The maximum transmission powers may be specific to a particular power amplifier. Different power amplifiers can have different nonlinear factors, and result in different levels of spectral leakage.

For example, for each channel, the measurement can start from the maximum transmission power permitted by the regulations. The out-of-band spectral leakage is measured to determine whether the spectral leakage violates the spectral leakage specification. If the spectral leakage violates the spectral leakage specification, the transmission power is reduced by 1 dB and the measurement is repeated until the out-of-band spectral leakage no longer violates the spectral leakage specification.

Figure 3:
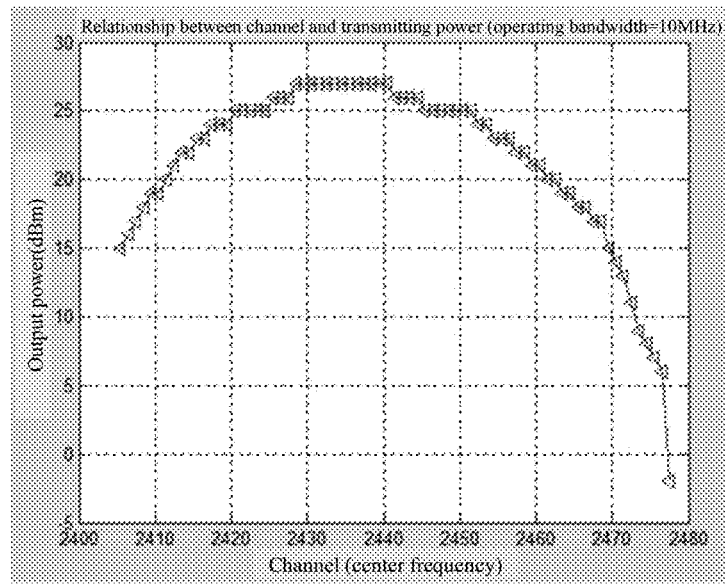
FIG. 3 is a schematic diagram of maximum transmission powers for channels in 2.4 GHz band according to an example embodiment of the present disclosure.

For example, FIG. 3 is a schematic diagram of maximum transmission powers for each channel in 2.4 GHz band according to an example embodiment of the present disclosure. Different channels correspond to different maximum transmission powers. As shown in FIG. 3, the maximum transmission powers for the channels in the middle of the frequency band are higher than the maximum transmission powers for the channels in the periphery of the frequency band.

The method for setting the transmission power of the communication system may be combined with other techniques for reducing sideband spectral leakage, which can include, but are not limited to, a digital filtering technique, a crest factor reduction technique, or a digital predistortion technique.

In some embodiments, the transmission powers for the channels are maximized without violating the transmission power specification and the spectral leakage specification permitted by the regulations to obtain a maximum effective communication distance.

In some embodiments, the plurality of channels may include a plurality of first channels and a plurality of second channels. The maximum transmission power for each of the plurality of first channels is obtained based on spectral leakage compliance and transmission power compliance. The transmission power for each of the plurality of second channels is a preset transmission power.

Specifically, the first channels may be concentrated in the middle of the operating frequency band and all the second channels may be in the periphery of the operating frequency band. For example, when the operating frequency band is approximately between 2.40 GHz and 2.48 GHz, the center portion of the operating frequency band is approximately between 2.43 GHz and 2.45 GHz, and the periphery of the operating frequency band is approximately between the 2.40 GHz and 2.43 GHz and between 2.45 GHz and 2.48 GHz.

Figure 4:
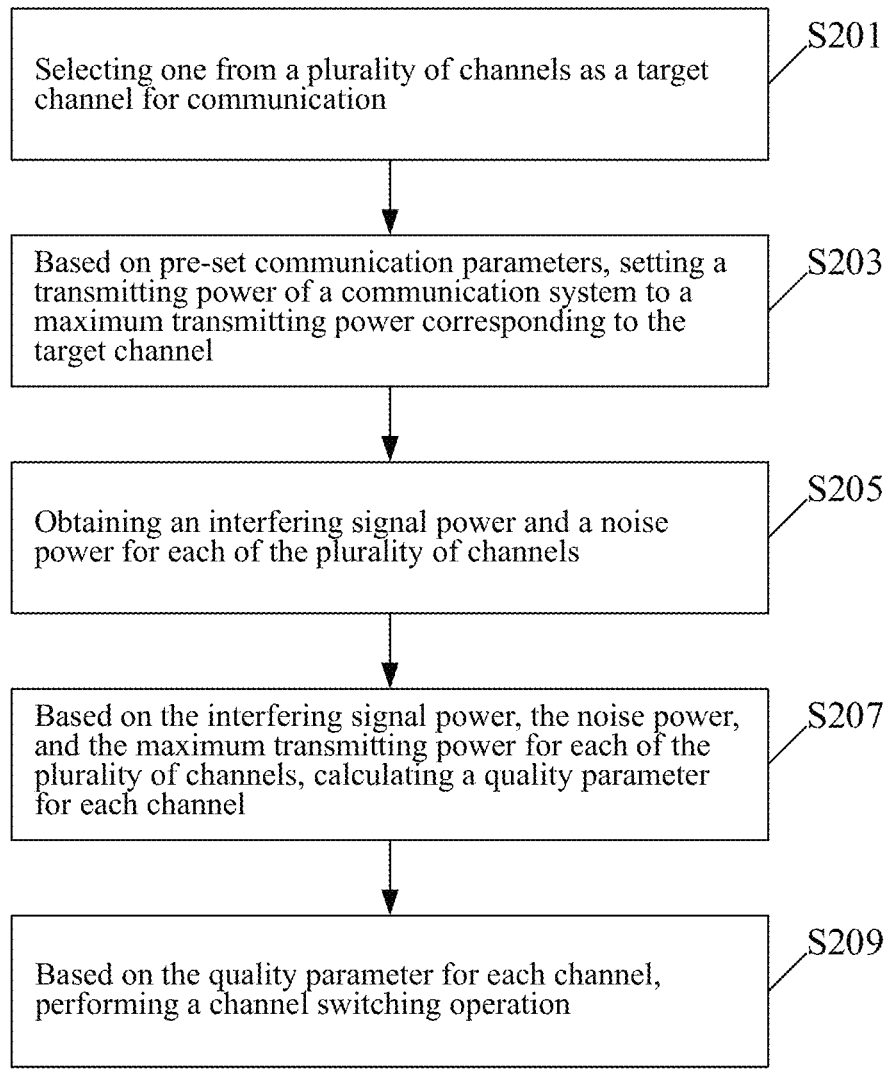
FIG. 4 is a flowchart of a method for setting a transmission power of a communication system according to another example embodiment of the present disclosure.

FIG. 4 is a flowchart of a method for setting a transmission power of a communication system according to another example embodiment of the present disclosure. As shown in FIG. 4, the method may include at least the following.

S201 is similar to S101, and details thereof are not described herein again.

S203 is similar to S103, and details thereof are not described herein again.

At S205, an interference signal power and a noise power are obtained for each of the plurality of channels.

Specifically, each channel is monitored to obtain the interference signal power and the noise power for each channel.

At S207, based on the interference signal power, the noise power, and the maximum transmission power for each of the plurality of channels, a quality parameter for each channel is calculated.

In some embodiments, the quality parameter may be the signal-to-interference-plus-noise ratio (SINR), i.e., the ratio of the maximum transmission power over the sum of the interference signal power and the noise power.

In some embodiments, the quality parameter may be the signal-to-noise ratio (SNR), i.e., the ratio of the maximum transmission power over the noise power.

In some embodiments, the quality parameter may be the signal-to-interference ratio (SIR), i.e., the ratio of the maximum transmission power over the interference signal power.

At S209, based on the quality parameter for each channel, a channel switching operation is performed.

Specifically, the channel having the best quality parameter is selected as the target channel. When the quality parameter is the SINR, the lower the SINR, the better the quality parameter. Thus, the channel having the lowest SINR is selected as the target channel to switch to. When the quality parameter is the SNR, the lower the SNR, the better the quality parameter. Thus, the channel having the lowest SNR is selected as the target channel to switch to. When the quality parameter is the SIR, the lower the SIR, the better the quality parameter. Thus, the channel having the lowest SIR is selected as the target channel to switch to.

Specifically, after the target channel to switch to is determined, a channel switching command may be received. The command may include a channel id of the target channel to switch to. Based on the channel switching command, the operating channel of the communication system is switched to the target channel to switch to.

In some embodiments, the entire operating frequency band of the communication system may be utilized to reduce mutual interference between devices and to improve communication quality.

Figure 5:
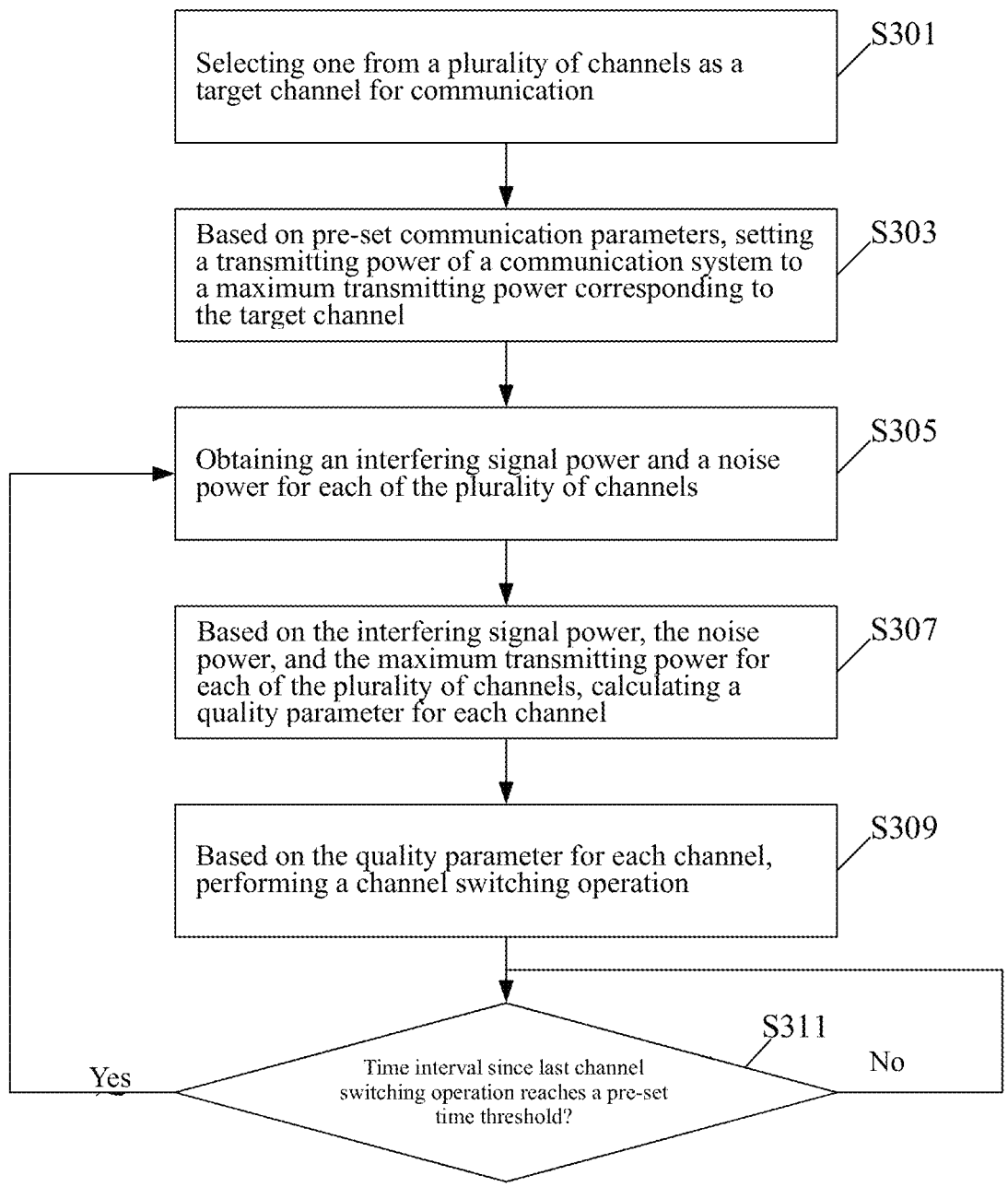
FIG. 5 is a flowchart of a self-adaptive frequency selection method according to an example embodiment of the present disclosure.

Based on the foregoing embodiments of the present disclosure, the present disclosure provides a self-adaptive frequency selection method. As shown in FIG. 5, the method at least includes the following.

S301-S309 are similar to S201-S209, and details thereof are not described herein again.

At S311, whether a time interval since last channel switching operation reaches a pre-set time threshold is determined. If the time interval reaches the pre-set time threshold, S305 is executed, and the interference signal power and the noise power for each of the plurality of channels are obtained again. If the time interval has not reached the pre-set time threshold, S311 is executed again.

Specifically, because the interference signal and the noise for each channel are not fixed, it may be needed to periodically obtain the interference signal power and the noise power for each of the plurality of channels and select the channel having the best quality parameter as the operating channel for the communication system, thereby ensuring the quality of the communication system.

Specifically, the pre-set time threshold may be, for example, 100 ms, 150 ms, or 300 ms, etc. The smaller the time threshold, the more likely the communication system consistently operates at the best channel.

In the embodiments of the present disclosure, the transmission powers for different channels are set differently to fully utilize the frequency band resource and to maximize the transmission powers without violating the transmission power specification and the spectral leakage specification permitted by the regulations. At the same time, a trigger condition for the self-adaptive frequency selection is set to track the environment or quality of the channels in real time, thereby ensuring that the communication system consistently operates at the best channel.

Figure 6:
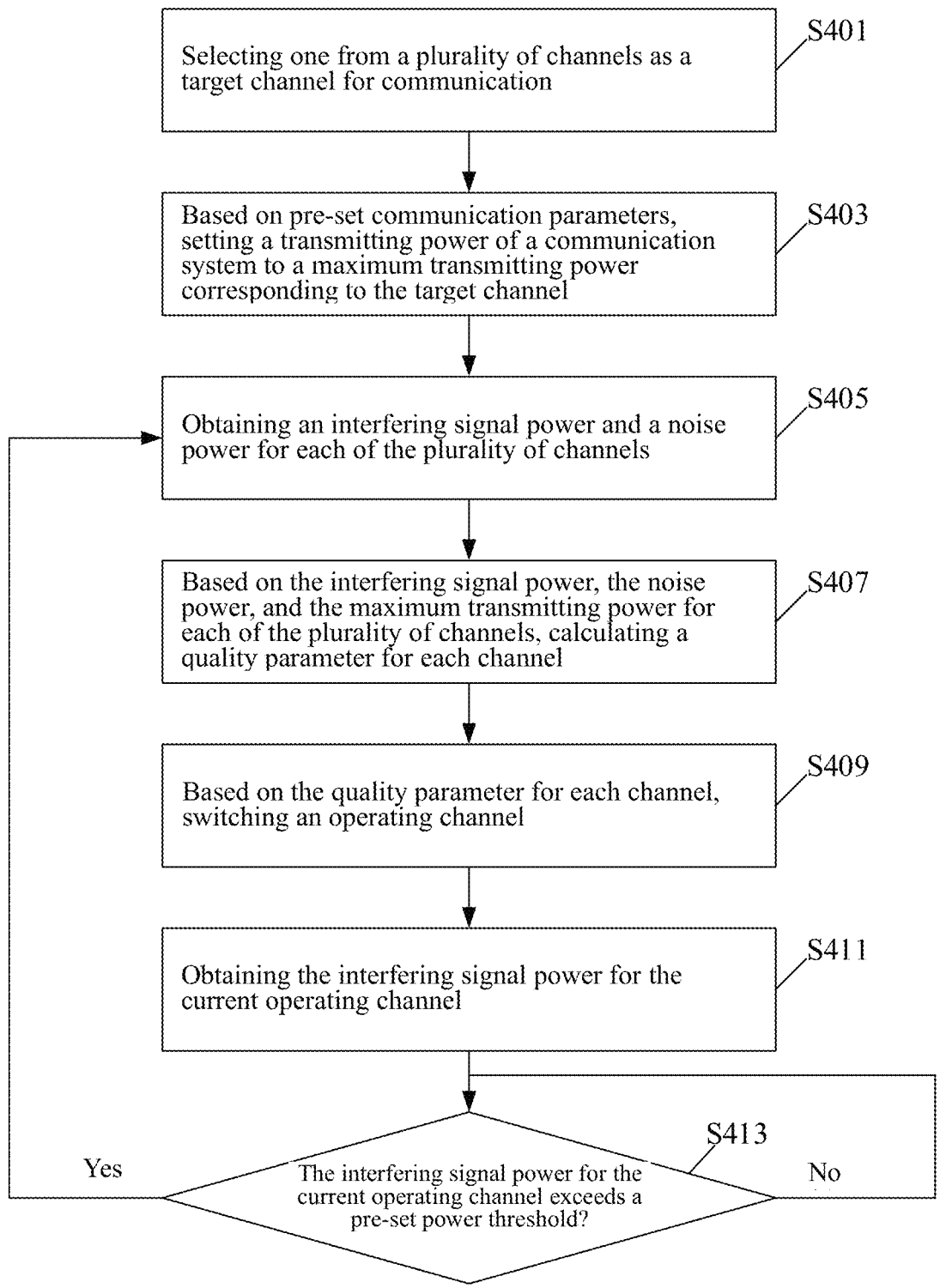
FIG. 6 is a flowchart of a self-adaptive frequency selection method according to another example embodiment of the present disclosure.

Based on the foregoing embodiments of the present disclosure, the present disclosure provides another self-adaptive frequency selection method. As shown in FIG. 6, the method at least includes the following.

S401-S409 are similar to S201-S209, and details thereof are not described herein again.

At S411, the interference signal power for the current operating channel is obtained.

At S413, whether the interference signal power for the current channel exceeds a pre-set power threshold is determined. If the interference signal power for the current channel exceeds the pre-set power threshold, S405 is executed, and the interference signal power and the noise power for each of the plurality of channels are obtained again. If the interference signal power for the current channel does not exceed the pre-set power threshold, S413 is executed again.

Specifically, because a sudden event may occur to produce a strong interference signal, when the interference signal power for the current channel is detected to exceed the pre-set power threshold, the interference signal power and the noise power for each of the plurality of channels in the communication system are obtained again to select the channel having the best quality parameter as the operating channel for the communication system, thereby ensuring the quality of the communication system.

In the embodiments of the present disclosure, the transmission powers for different channels are set differently to fully utilize the frequency band resource and to maximize the transmission powers without violating the transmission power specification and the spectral leakage specification permitted by the regulations. At the same time, the trigger condition for the self-adaptive frequency selection is set to track the environment or quality of the channels in real time, thereby ensuring that the communication system consistently operates at the best channel.

The trigger conditions for the two self-adaptive frequency selection methods described above can be independent of each other. When the time interval since the last channel switching operation reaches the pre-set time threshold or the interference signal power for the current channel exceeds the pre-set power threshold, it is considered that the trigger condition for the self-adaptive frequency selection is met. Tracking the environment or quality of the channels in real time may ensure that the communication system consistently operates at the best channel.

Figure 7:
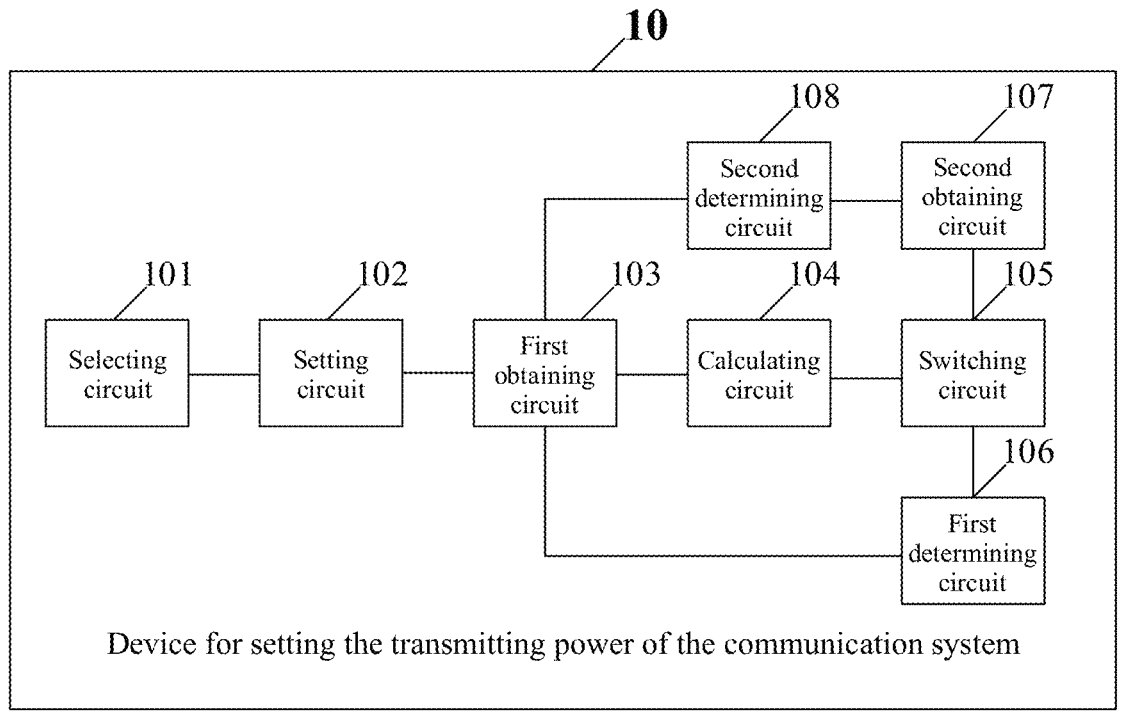
FIG. 7 is a schematic diagram of a device for setting a transmission power of a communication system according to an example embodiment of the present disclosure.

The present disclosure also provides a device for setting a transmission power of a communication system. As shown in FIG. 7, the device for setting the transmission power of the communication system may at least include: a selecting circuit 101 configured to select one from a plurality of channels as a target channel for communication and a setting circuit 102 configured to set the transmission power of the communication system to a maximum transmission power corresponding to the target channel based on pre-set communication parameters. The pre-set communication parameters include the maximum transmission power for each of the plurality of channels.

In some embodiments, the maximum transmission power for each of the plurality of channels is obtained based on the compliance with the spectral leakage specification and the transmission power specification permitted by the regulations.

In some embodiments, in addition to the selecting circuit 101 and the setting circuit 102, the device 10 further includes a first obtaining circuit 103 configured to obtain the interference signal power and the noise power for each of the plurality of channels, a calculating circuit 104 configured to calculate the quality parameter for each channel based on the interference signal power, the noise power, and the maximum transmission power for each of the plurality of channels, and a switching circuit 105 configured to switch the operating channel based on the quality parameters.

In some embodiments, in addition to the selecting circuit 101, the setting circuit 102, the first obtaining circuit 103, the calculating circuit 104, and the switching circuit 105, the device 10 further includes a first determining circuit 106 configured to determine whether the time interval since the last channel switching operation reaches a pre-set time threshold. If the time interval since the last channel switching operation reaches the pre-set time threshold, the first obtaining circuit 103 is triggered to obtain the interference signal power and the noise power for each of the plurality of channels.

In some embodiments, in addition to the selecting circuit 101, the setting circuit 102, the first obtaining circuit 103, the calculating circuit 104, and the switching circuit 105, the device 10 further includes a second obtaining circuit 107 configured to obtain the interference signal power and the noise power for the current channel and a second determining circuit 108 configured to determine whether the interference signal power exceeds a pre-set power threshold. If the interference signal power exceeds the pre-set power threshold, the first obtaining circuit 103 is triggered to obtain the interference signal power and the noise power for each of the plurality of channels.

In the embodiments of the present disclosure, the transmission powers for different channels are set differently to fully utilize the frequency band resource and to maximize the transmission powers without violating the transmission power specification and the spectral leakage specification permitted by the regulations. At the same time, the trigger condition for the self-adaptive frequency selection is set to track the environment or quality of the channels in real time, thereby ensuring that the communication system consistently operates at the best channel.

Figure 8:
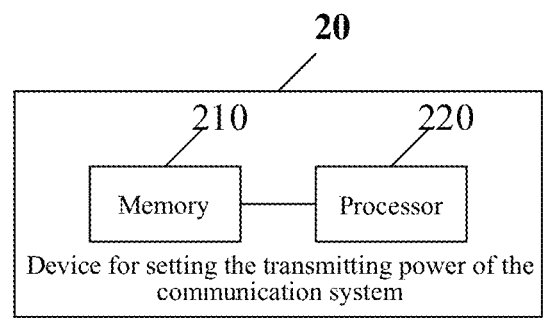
FIG. 8 is a schematic diagram of a device for setting a transmission power of a communication system according to another example embodiment of the present disclosure.

The present disclosure also provides another device for setting the transmission power of the communication system. As shown in FIG. 8, the device 20 for setting the transmission power of the communication system may at least include a memory 210 configured to store a command for setting the transmission power and a processor 220 configured to invoke the command for setting the transmission power stored in the memory 210 and to execute: selecting one from the plurality of channels as the target channel for communication; and based on the pre-set communication parameters, setting the transmission power of the communication system to the maximum transmission power corresponding to the target channel. The pre-set communication parameters include the maximum transmission power for each of the plurality of channels.

In some embodiments, the maximum transmission power for each of the plurality of channels is obtained based on the compliance with the spectral leakage specification and the transmission power specification permitted by the regulations.

In some embodiments, the processor 220 is further configured to: obtain the interference signal power and the noise power for each of the plurality of channels; based on the interference signal power, the noise power, and the maximum transmission power for each of the plurality of channels, calculate the quality parameter for each channel; and based on the quality parameter for each channel, switch the operating channel.

In some embodiments, after the operating channel is switched based on the quality parameter for each channel, the processor 220 is further configured to: determine whether the time interval since the last channel switching operation reaches the pre-set time threshold; and if the time interval since the last channel switching operation reaches the pre-set time threshold, execute the step of obtaining the interference signal power and the noise power for each channel in the operating frequency band of the communication system.

In some embodiments, after the operating channel is switched based on the quality parameter for each channel, the processor 220 is further configured to: obtain the interference signal power for the current channel of the communication system; determine whether the interference signal power for the current channel exceeds the pre-set power threshold; and if the interference signal power for the current channel exceeds the pre-set power threshold, execute the step of obtaining the interference signal power and the noise power for each of the plurality of channels.

In the embodiments of the present disclosure, the transmission powers for different channels are set differently to fully utilize the frequency band resource and to maximize the transmission powers without violating the transmission power specification and the spectral leakage specification permitted by the regulations. At the same time, the trigger condition for the self-adaptive frequency selection is set to track the environment or quality of the channels in real time, thereby ensuring that the communication system consistently operates at the best channel.

One of ordinary skill in the art can understand that all or part of the methods in the foregoing embodiments may be implemented by a computer program instructing a related hardware. The program may be stored in a computer readable storage medium. When being executed, the program performs the flowcharts of the foregoing embodiments. The storage medium may be a magnetic disk, an optical disk, a read-only memory (ROM), or a random-access memory (RAM), etc.

The foregoing descriptions are merely some implementation manners of the present disclosure, but the scope of the present disclosure is not limited thereto. Without departing from the spirit and principles of the present disclosure, any modifications, equivalent substitutions, and improvements, etc. shall fall within the scope of the present disclosure.

What is claimed is:

1. A transmission power setting method comprising:
selecting one of a plurality of channels of a communication system as a target channel for communication;
based on pre-set communication parameters, setting a transmission power of the communication system to be a maximum transmission power corresponding to the target channel, the pre-set communication parameters including maximum transmission powers for the plurality of channels;
for each of the plurality of channels:
obtaining an interference signal power and a noise power for each of a plurality of channels; and based on the interference signal power, the noise power, and the maximum transmission power for the channel, calculating a quality parameter of the channel; and performing a channel switching operation based on the quality parameters of the plurality of channels.

2. The method of claim 1, wherein the maximum transmission powers for the plurality of channels are obtained based on compliance with a spectral leakage specification and a transmission power specification.

3. The method of claim 1, further comprising, after the channel switching operation is performed:
determining whether a time interval since the channel switching operation reaches a pre-set time threshold; and
in response to the time interval reaching the pre-set time threshold, obtaining again the interference signal power and the noise power for each of the plurality of channels.

4. The method of claim 1, further comprising, after the channel switching operation is performed:
obtaining the interference signal power for a current operating channel of the communication system;
determining whether the interference signal power for the current operating channel exceeds a pre-set power threshold; and
in response to the interference signal power for the current operating channel exceeding the pre-set power threshold, obtaining again the interference signal power and the noise power for each of the plurality of channels.

5. A transmission power setting device comprising:
a memory storing a transmission power setting command; and
a processor configured to invoke the transmission power setting command to:
select one from a plurality of channels of a communication system as a target channel for communication;
based on pre-set communication parameters, set a transmission power of the communication system to be a maximum transmission power corresponding to the target channel, the pre-set communication parameters including maximum transmission powers for the plurality of channels;
for each of the plurality of channels:
obtain an interference signal power and a noise power; and
based on the interference signal power, the noise power, and the maximum transmission power for the channel, calculate a quality parameter of the channel; and
perform a channel switching operation based on the quality parameters of the plurality of channels.

6. The device of claim 5, wherein the maximum transmission powers for the plurality of channels are obtained based on compliance with a spectral leakage specification and a transmission power specification.

7. The device of claim 5, wherein the processor is further configured to invoke the transmission power setting command to, after the channel switching operation is performed:
determine whether a time interval since the channel switching operation reaches a pre-set time threshold; and
in response to the time interval reaching the pre-set time threshold, obtain again the interference signal power and the noise power for each of the plurality of channels.

8. The device of claim 5, wherein the processor is further configured to invoke the transmission power setting command to, after the channel switching operation is performed:
obtain the interference signal power for a current operating channel of the communication system;
determine whether the interference signal power for the current operating channel exceeds a pre-set power threshold; and
in response to the interference signal power for the current operating channel exceeding the pre-set power threshold, obtain again the interference signal power and the noise power for each of the plurality of channels.

9. A computer readable storage medium storing a computer program that, when executed by a processor, causes the processor to:
select one from a plurality of channels of a communication system as a target channel for communication;
based on pre-set communication parameters, set a transmission power of the communication system to be a maximum transmission power corresponding to the target channel, the pre-set communication parameters including maximum transmission powers for the plurality of channels;
for each of the plurality of channels:
obtain an interference signal power and a noise power; and
based on the interference signal power, the noise power, and the maximum transmission power for the channel, calculate a quality parameter of the channel; and
perform a channel switching operation based on the quality parameters of the plurality of channels.

10. The computer readable storage medium of claim 9, wherein the maximum transmission powers for the plurality of channels are obtained based on compliance with a spectral leakage specification and a transmission power specification.

11. The computer readable storage medium of claim 9, wherein the computer program further causes the processor to, after the channel switching operation is performed:
determine whether a time interval since the channel switching operation reaches a pre-set time threshold; and
in response to the time interval reaching the pre-set time threshold, obtain again the interference signal power and the noise power for each of the plurality of channels.

12. The computer readable storage medium of claim 9, wherein the computer program further causes the processor to, after the channel switching operation is performed:
obtain the interference signal power for a current operating channel of the communication system;
determine whether the interference signal power for the current operating channel exceeds a pre-set power threshold; and
in response to the interference signal power for the current operating channel exceeding the pre-set power threshold, obtain again the interference signal power and the noise power for each of the plurality of channels.

* * * * *